United States Patent
Davis et al.

(10) Patent No.: US 10,923,757 B2
(45) Date of Patent: Feb. 16, 2021

(54) FUEL CELL MODULE HOUSING WITH FIELD REPLACEABLE STACKS

(71) Applicant: FuelCell Energy, Inc., Danbury, CT (US)

(72) Inventors: Keith Davis, Southbury, CT (US); Stephen Jolly, Southington, CT (US); Michael L. Quatannens, Chappaqua, NY (US); Matthew Lambrech, Sherman, CT (US)

(73) Assignee: FuelCell Energy, Inc., Danbury, CT (US)

( * ) Notice: Subject to any disclaimer, the term of this patent is extended or adjusted under 35 U.S.C. 154(b) by 0 days.

(21) Appl. No.: 16/992,659

(22) Filed: Aug. 13, 2020

(65) Prior Publication Data

US 2020/0373605 A1 Nov. 26, 2020

Related U.S. Application Data

(62) Division of application No. 16/094,860, filed as application No. PCT/US2017/028854 on Apr. 21, 2017, now Pat. No. 10,777,838.

(60) Provisional application No. 62/326,499, filed on Apr. 22, 2016, provisional application No. 62/329,885, filed on Apr. 29, 2016.

(51) Int. Cl.
*H01M 8/2485* (2016.01)
*H01M 8/2475* (2016.01)
*H01M 8/249* (2016.01)
*H01M 8/2484* (2016.01)
*H01M 8/14* (2006.01)

(52) U.S. Cl.
CPC ......... *H01M 8/2485* (2013.01); *H01M 8/249* (2013.01); *H01M 8/2475* (2013.01); *H01M 8/2484* (2016.02); *H01M 2008/147* (2013.01); *Y02E 60/50* (2013.01)

(58) Field of Classification Search
CPC ..... H01M 8/008; H01M 8/0271–0286; H01M 8/10–1286; H01M 8/24–2435; H01M 8/2465–2495
See application file for complete search history.

(56) References Cited

U.S. PATENT DOCUMENTS

| 4,548,875 A | * | 10/1985 | Lance | .................. | H01M 8/247 429/434 |
| 5,413,878 A | | 5/1995 | Williams et al. | | |

(Continued)

OTHER PUBLICATIONS

International Search Report and Written Opinion for PCT/US17/28854 dated Jul. 7, 2017 (7 pages).

(Continued)

*Primary Examiner* — Jonathan Crepeau
*Assistant Examiner* — Jacob Buchanan
(74) *Attorney, Agent, or Firm* — Foley & Lardner LLP

(57) ABSTRACT

A fuel cell module includes a plurality of fuel cell stacks; a manifold configured to provide process gases to and receive process gases from the plurality of fuel cell stacks; and a module housing enclosing the plurality of fuel cell stacks and the manifold. Each of the plurality of fuel cell stacks is individually installable onto the manifold by lowering the fuel cell stack onto the manifold, and is individually removable from the manifold by raising the fuel cell stack from the manifold.

15 Claims, 8 Drawing Sheets

(56) References Cited

U.S. PATENT DOCUMENTS

| | | | |
|---|---|---|---|
| 5,518,828 A * | 5/1996 | Senetar | H01M 8/04089 |
| | | | 429/439 |
| 5,543,240 A | 8/1996 | Lee et al. | |
| 5,688,610 A * | 11/1997 | Spaeh | H01M 8/247 |
| | | | 429/471 |
| 5,741,605 A * | 4/1998 | Gillett | H01M 8/247 |
| | | | 429/415 |
| 6,001,501 A | 12/1999 | Collie | |
| 6,110,614 A | 8/2000 | Fellows et al. | |
| 6,703,722 B2 | 3/2004 | Christensen | |
| 7,049,017 B2 | 5/2006 | Bai et al. | |
| 7,800,340 B2 | 9/2010 | Berntsen et al. | |
| 7,803,474 B2 | 9/2010 | Inagaki | |
| 7,951,496 B2 | 5/2011 | Weingaertner et al. | |
| 8,440,362 B2 | 5/2013 | Richards et al. | |
| 8,460,838 B2 | 6/2013 | Gillett et al. | |
| 2004/0043274 A1 | 3/2004 | Scartozzi et al. | |
| 2009/0053569 A1 * | 2/2009 | Perry | H01M 8/249 |
| | | | 429/408 |
| 2010/0297515 A1 | 11/2010 | Erikstrup et al. | |
| 2011/0081592 A1 | 4/2011 | Ma et al. | |
| 2011/0110754 A1 * | 5/2011 | Lin | H01M 8/2432 |
| | | | 414/729 |
| 2011/0143239 A1 | 6/2011 | Ogawa et al. | |
| 2011/0269042 A1 | 11/2011 | Schneider et al. | |
| 2011/0269052 A1 | 11/2011 | Haltiner et al. | |
| 2011/0281185 A1 * | 11/2011 | Sridhar | H01M 8/0675 |
| | | | 429/408 |
| 2012/0171584 A1 | 7/2012 | Weingaertner et al. | |
| 2012/0189940 A1 * | 7/2012 | Richards | H01M 8/06 |
| | | | 429/471 |

OTHER PUBLICATIONS

Non-Final Office Action on U.S. Appl. No. 16/094,860 dated Jan. 15, 2020.

Notice of Allowance on U.S. Appl. No. 16/094,860 dated May 14, 2020.

* cited by examiner

FUEL CELL MODULE HOUSING WITH FIELD REPLACEABLE STACKS

CROSS-REFERENCE TO RELATED PATENT APPLICATIONS

The present application is a divisional of U.S. patent application Ser. No. 16/094,860, filed Oct. 18, 2018, which is a U.S. national stage entry of PCT/US2017/028854, filed on Apr. 21, 2017, which claims the benefit of U.S. Provisional Appl. No. 62/326,499, filed on Apr. 22, 2016, and U.S. Provisional Appl. No. 62/329,885, filed on Apr. 29, 2016, the entire disclosures of which are hereby incorporated by reference herein.

BACKGROUND

The present disclosure relates to fuel cell systems. In particular, the present disclosure relates to a fuel cell module housing that includes a plurality of fuel cell stacks that can be individually erected, installed, repaired or replaced in the field.

A fuel cell is a device which uses an electrochemical reaction to convert chemical energy stored in a fuel such as hydrogen or methane into electrical energy. In general, fuel cells include an anode to catalytically react with the fuel and a cathode in fluid communication with an oxidant such as air.

Fuel cells are typically arranged in a stacked relationship. A fuel cell stack includes many individual cells positioned between a fixed end plate and a free end plate. One fuel cell stack configuration includes an externally manifolded stack, wherein the fuel cell stack is left open on its sides and a fluid such as a fuel or oxidant is delivered by way of manifolds sealed to peripheral portions of respective sides of the fuel cell stack. The manifolds thus provide sealed passages for delivering the fuel and the oxidant gases to the fuel cells and directing the flow of such gases in the stack, thereby preventing those gases from leaking either to the environment or to the other manifolds. Such manifolds are typically used in Molten Carbonate Fuel Cells (MCFC) which operate at approximately 650° C. During operation of MCFCs, the fuel cells and endplates can move relative to the fuel cell manifolds.

Conventional fuel cells typically include an anode and a cathode separated by an electrolyte contained in an electrolyte matrix. The anode, the cathode, the electrolyte and the electrolyte matrix are disposed between a first collector and a second collector, with the first collector adjacent to the anode and the second collector adjacent to the cathode. Fuel flows to the anode via the first collector and an oxidant flows to the cathode via the second collector. The fuel cell oxidizes the fuel in an electrochemical reaction which releases a flow of electrons between the anode and cathode, thereby converting chemical energy into electrical energy.

The fuel cells described above can be stacked in series with separator plates disposed between adjacent fuel cells and end plates (e.g., a fixed end plate and a free end plate) disposed on opposing ends of the fuel cell stack. Alternatively, the fuel cells described above can be stacked in parallel, and connected, for example, by a power bus. Fuel cells are stacked to increase the electrical energy they produce. Fuel cell stacks have a negative side with a negative end cell and a positive side with a positive end cell.

In order to increase power output without having to unduly increase the size (i.e., surface area) of individual fuel cells or the number of individual fuel cells in a fuel cell stack, a plurality of fuel cell stacks are electrically and fluidly connected. As described, for example, in U.S. Patent Application Publication No. 2011/0269052, in systems including a plurality of fuel cell stacks, an "open-cell design" in which fuel cell stacks are placed into a relatively large enclosure that directs fuel and air into stacks housed within the enclosure and receives tail gas and spent air from those stacks for optional further processing and ultimate discharge to the outside. Alternatively, an "enclosed-cell design" may be used in which internal manifold channels are used for fuel and air flow.

For large module enclosures including a large number of fuel cell stacks, it is difficult or impossible to transport the module due to size and cost consideration. A power plant may include several of these large module enclosures. During repair or replacement of an individual fuel cell stack in the large module enclosure, all of the fuel cell stacks need to be taken offline (i.e., shut down) because when the "hot zone" containing the fuel cell stacks is opened, the zone would be cooled down. As a result, the remaining fuel cell stacks would likely not be able to operate at the lower temperatures.

A need exists for improved technology, including technology related to a power plant including a plurality of fuel cell module housings (i.e., module enclosures) sized such that only a partial shutdown is required when one of the plurality of fuel cell module housings is opened up to repair or replace an individual fuel cell stack. A need also exists for improved technology relating to a fuel cell module housing in which individual hot fuel cell stacks may be removed, and repaired or replaced from the housing, without having to cool down the remaining plurality of fuel cell stacks in the housing.

SUMMARY

In one embodiment, a fuel cell module comprises a plurality of fuel cell stacks; a manifold configured to provide process gases to and receive process gases from the plurality of fuel cell stacks; and a module housing enclosing the plurality of fuel cell stacks and the manifold. Each of the plurality of fuel cell stacks is individually installable onto the manifold by lowering the fuel cell stack onto the manifold, and is individually removable from the manifold by raising the fuel cell stack from the manifold.

In one aspect of this embodiment, each of the plurality of fuel cell stacks is installable onto and removable from the manifold without manual mechanical attachment between the fuel cell stack and the manifold.

In one aspect of this embodiment, the module housing includes at least one hot region and at least one cool region, wherein the at least one cool region is located above the at least one hot region; the plurality of fuel cell stacks are located in the at least one hot region; and each of the plurality of fuel cell stacks is individually installable onto the manifold by lowering the fuel cell stack from the at least one cool region to the at least one hot region, and is individually removable from the manifold by raising the fuel cell stack from the at least one hot region to the at least one cool region.

In one aspect of this embodiment, the fuel cell module further comprises upper thermal insulation disposed between the at least one hot region and the at least one cool region. The upper thermal insulation includes removable sections that are removable from respective overhead openings to allow the fuel cell stacks to be installed onto and removed from the manifold via the overhead openings.

In one aspect of this embodiment, one of the removable sections corresponds to each of the plurality of fuel cell stacks.

In one aspect of this embodiment, the at least one hot region includes at least one upper hot region and at least one lower hot region; the plurality of fuel cell stacks are located in the at least one upper hot region; and the manifold is located in the at least one lower hot region.

In one aspect of this embodiment, the fuel cell module further comprises a plurality of in-situ process gas seals configured to seal between the plurality of fuel cell stacks and the manifold, wherein the in-situ process gas seals operate via static force from the weight of the fuel cell stacks.

In one aspect of this embodiment, the fuel cell module further comprises at least one bus-bar that is located in the at least one cool region and is configured to transfer current from the plurality of fuel cell stacks to power conditioning equipment.

In one aspect of this embodiment, each of the plurality of fuel cell stacks comprises a plurality of molten carbonate fuel cells.

In another embodiment, a power plant comprises: a plurality of fuel cell modules, wherein each of the fuel cell modules comprises: a plurality of fuel cell stacks; a manifold configured to provide process gases to and receive process gases from the plurality of fuel cell stacks; and a module housing enclosing the plurality of fuel cell stacks and the manifold; wherein each of the plurality of fuel cell stacks is individually installable onto the manifold by lowering the fuel cell stack onto the manifold, and is individually removable from the manifold by raising the fuel cell stack from the manifold.

In one aspect of this embodiment, the power plant is configured such that, when one of the plurality of fuel cell modules is taken offline, the remaining fuel cell modules are configured to continue to operate.

In one aspect of this embodiment, the plurality of fuel cell modules are divided into a plurality of module arrangements, each of which includes a primary module and a secondary module; and in each module arrangement, the primary module is configured to output oxidant gas to secondary module.

In one aspect of this embodiment, each module arrangement includes first and second primary modules, each of which is configured to output oxidant gas to the secondary module.

In one aspect of this embodiment, the manifold comprises a common oxidant gas duct that includes an oxidant supply duct configured to supply the oxidant gas to the first and second primary modules and an oxidant exhaust duct configured to receive oxidant exhaust from the secondary module.

In one aspect of this embodiment, the plurality of fuel cell modules are configured to receive anode gas in parallel.

One of ordinary skill in the art would appreciate that the aspects described above are not mutually exclusive and may be combined.

These and other advantageous features will become apparent to those reviewing the disclosure and drawings.

BRIEF DESCRIPTION OF THE DRAWINGS

In FIG. 2, 200 fuel cell stacks are shown.

DETAILED DESCRIPTION

Figure 1:
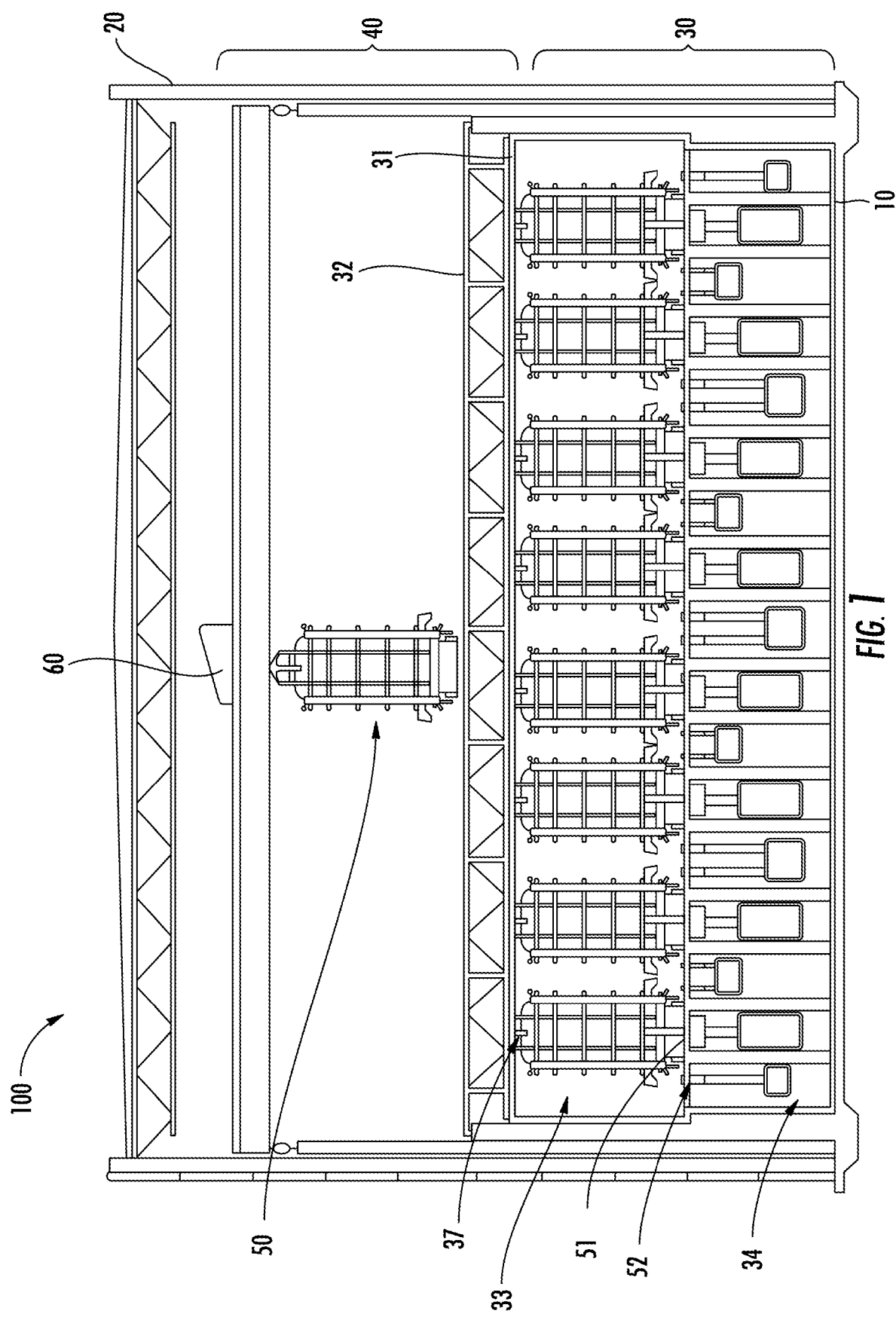
FIG. 1 is a cross-sectional view of a first embodiment of a fuel cell module housing configured to house a plurality of fuel cell stacks for large-scale, multi-megawatt (e.g., 100 MW+) power generation. The fuel cell module housing includes a hot region and a cool region.

Referring to FIG. 1-8, in general, the embodiments of a power plant include a plurality of fuel cell module housings (i.e., module enclosures), where the number of fuel cell module housings is selected such that only a partial shutdown is required when one of the plurality of fuel cell module housings is opened up to repair or replace an individual fuel cell stack. When one of the plurality of fuel cell module housings is taken offline, the plurality of fuel cell stacks in the remaining fuel cell module housings continue to operate.

Although the fuel cell module housings described below are configured to house a plurality of fuel cell stacks for large-scale, multi-megawatt (e.g., 100 MW+) power generation, the present invention is not limited in this regard. The fuel cell module housings may be applied to small power systems, and are therefore, not limited by size or power output.

The fuel cell stacks may be, for example, high-temperature fuel cell stacks such as Molten Carbonate Fuel Cells (MCFC) stacks, which operate at approximately 650° C. The fuel cell stacks may be arranged in series or in parallel. In each of the embodiments described below, the plurality of fuel cell stacks may be erected and installed in the field, thereby eliminating the costs and problems associated with shipping such large fuel cell arrangements. In addition, in each of the embodiments described below, individual fuel cell stacks may be accessed and replaced in the field. Moreover, in each of the embodiments described below, personnel do not have to enter the stack base area to access the plurality of fuel cell stacks.

For large-scale applications, grouping the plurality of fuel cell stacks into larger housings reduces the overall capital costs by eliminating smaller module enclosures and their associated piping, facilitates the replacement of individual fuel cell stacks (compared to replacing complete modules) and provides economies of scale that are not possible with factory shipped modules with lower fuel cell stack counts that must be packaged to be shipped and installed as a module. Additionally, added benefits are had by eliminating stack and module features that are needed for shipping. With field installed/replaceable stacks, shipping and transportation requirements such as dynamic shipping loads and permitting for oversized modules are eliminated.

First Embodiment

Referring to FIGS. 1-5, in a first embodiment, a fuel cell module includes a fuel cell module 100 that is divided into a plurality of levels in a height direction. A base 10 of the fuel cell module 100 is comprised of concrete. The concrete may be reinforced according to any method known in the art. The base 10 is configured to support a module housing 20 that houses a plurality of fuel cell stacks 50. The length and width dimensions of the module housing 20 are equal to or less than the length and width dimensions of the base 10, such that the entire surface area of the bottom surface of the module housing 20 contacts and is supported by the base 10. External plant support equipment may be placed on the base 10 in regions that do not contact the module housing 20.

The module housing 20 may be comprised, for example, of sheet metal siding and sheet metal roofing supported on roof trusses, or any other engineered structure suitable for insulated containment and support of equipment. The module housing 20 is divided into at least one hot region 30 and at least one cool region 40. A temperature of the hot region 30 is higher than a temperature of the cool region 40. For example, the cool region may nominally be near ambient temperatures in order to house equipment that requires cooler operating environments, such as DC power cables and personnel-accessible service connections (shown in FIG. 1). The cool region may also be maintained at near ambient temperatures to maintain the structural integrity of the building trusses 32, as well as other equipment such as a crane 60.

Figure 2:
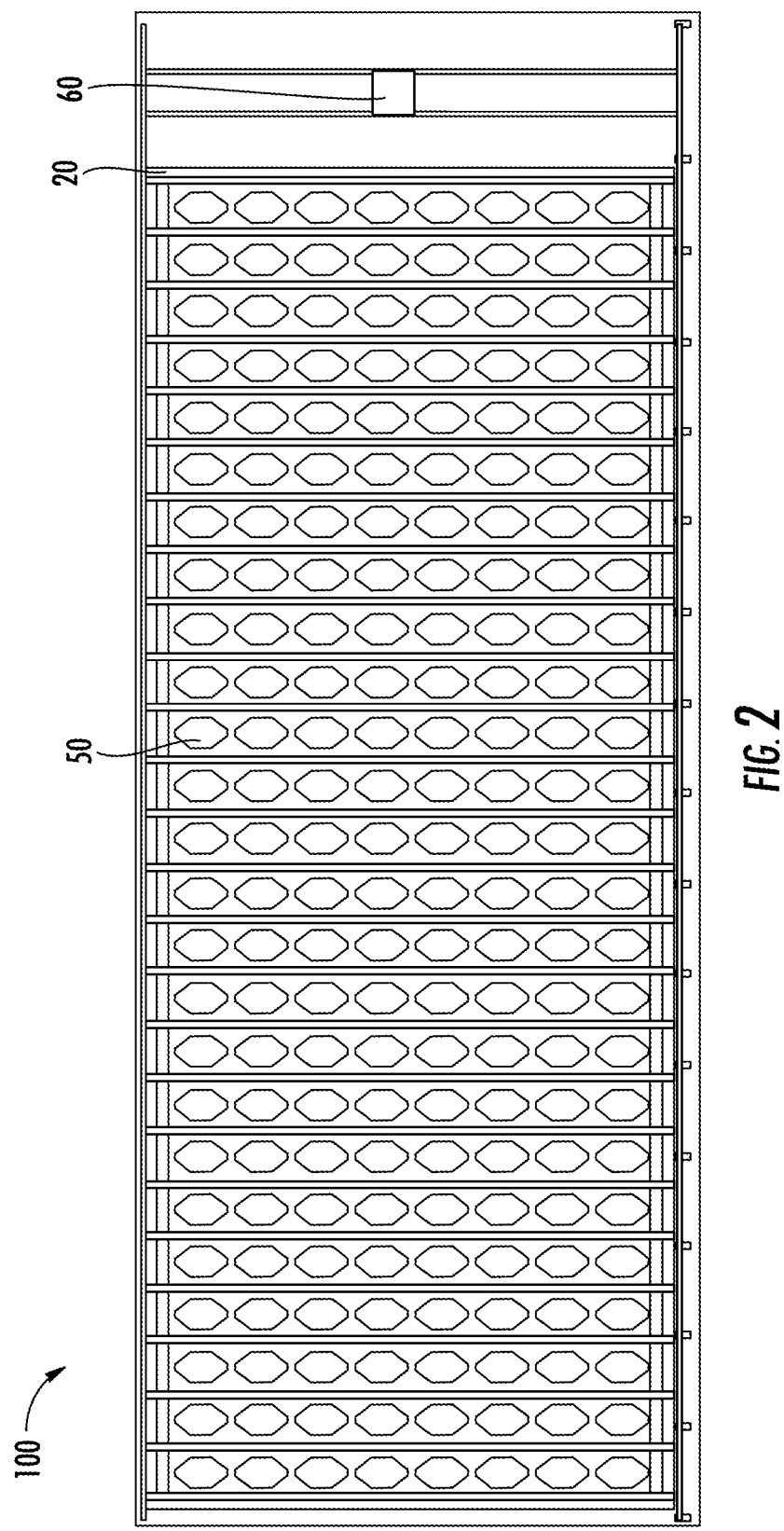
FIG. 2 is a plan view of the fuel cell module housing of FIG. 1 and illustrates the arrangement of the plurality of fuel cell stacks.
Figure 3:
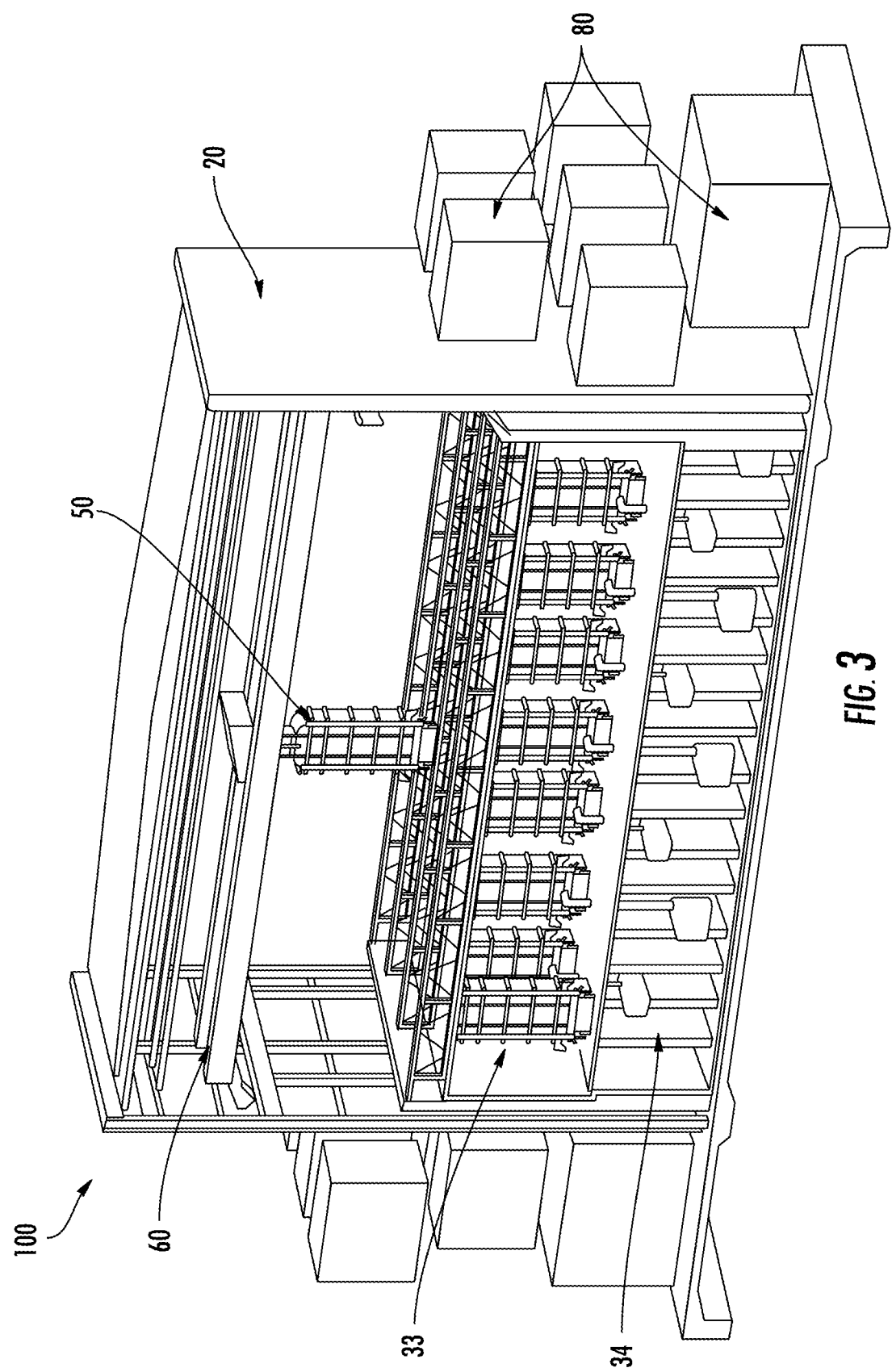
FIG. 3 is a cross-sectional perspective view of the fuel cell module housing of FIG. 1 and illustrates power equipment external to the enclosure.

The plurality of fuel cell stacks 50 are arranged in the hot region 30. The plurality of fuel cell stacks 50 may be arranged in columns and rows (as seen in FIG. 2) or arranged offset to one another (not illustrated). The plurality of fuel cell stacks 50 are supported in the hot region 30 of the module housing 20 on concrete and heat resistant supports 51 made, for example, of stainless steel. The hot region 30 includes thermal insulation 31 and steel trusses 32 mounted above the plurality of fuel cell stacks 50. Thermal insulation 31 supported by the trusses 32, and applied to the side walls and floor of the hot region 30, completely surrounds the plurality of fuel cell stacks 50 on all sides.

Each of the plurality of fuel cell stacks 50 may be accessed from the cool region 40 via removable sections of the upper thermal insulation 31. The fuel cell stacks 50 may be accessed by crane 60, for example, by a mobile crane configured to move around the building (not illustrated), or where plant footprint is a premium, an integrated bridge crane co-located in the building (see FIG. 1). The crane 60 is configured for placement of and access to each of the plurality of fuel cell stacks 50. As seen in FIG. 1, the crane 60 can access an individual fuel cell stack 50 in the hot region 30 and transport the individual fuel cell stack 50 to the cool region 40 where it can be removed from the fuel cell module 100 for maintenance, repair or replacement.

The hot region 30 may be divided into two regions by a stack base of the plurality of fuel cell stacks 50. An upper hot region 33 (i.e., a stack region) houses the plurality of fuel cell stacks 50. A lower hot region 34 (i.e., a process gas manifold region), located below the fuel stack base, houses the plant process gas manifolds and piping. Outside process gasses (anode and cathode) enter the module 100 via the lower hot region 34 and distribute upward to each of the plurality of fuel cell stacks, utilizing face, radial, and/or tapered seals 52 that are engaged in-situ when each of the fuel cell stacks is installed. The seals 52 are located at the interface between the upper hot region 33 and the lower hot region 34. Exhaust process gasses (anode and cathode) may also exit the module 100 via the lower hot region 34. For example, cathode and anode exhaust may be separately collected in a plurality of ducts 70 (see FIG. 4) located below the plurality of fuel cell stacks, and fed to an end of the module housing 20 where the cathode and anode exhaust are separately collected and/or subsequently separately fed to other process equipment outside the module housing 20 at the Balance of Plant (BoP) equipment. The ducting for gas distribution in the lower hot region 34 includes expansion joints to accommodate thermal expansion.

In-situ process gas seals 52 may be provided between the lower hot region 34 and the fuel cell stack base that divides the hot region 30 into the upper hot region 33 and the lower hot region 34. Sealing is relative, and minimized leak joints are more appropriate, especially for cathode gases where a leak less than approximately one percent could be tolerated. This enables the use of somewhat porous and compliant materials, for effective in-situ seals 52. Such in-situ seals 52 may include gas seals such as compressive seals, radial seals, and/or tapered seals. The seals 52 may be effected via various methods including static force from the weight of the fuel cell stacks 50 compressing a gasket or ring seal, differential thermal expansion providing a radial seal, and/or mechanical joining of tapered ports.

If the seals are effected via static force from the weight of the fuel cell stacks compressing a gasket or ring seal, the need for additional mechanical means (e.g., bolting) to provide sealing can be eliminated. In one embodiment, fuel cell stacks may be installed (e.g., lowered onto a mating manifold surface), operated, and removed (e.g., raised from the mating manifold surface) without needing service personnel to bolt and unbolt the fuel cell stack to the manifold. In other words, embodiments disclosed herein may allow the fuel cell stack to be secured to a manifold for operational purposes without the need for additional mechanical means, which would in turn minimize the need for human (or automated) means of manipulating securing hardware (e.g., bolts, screws).

Figure 8:
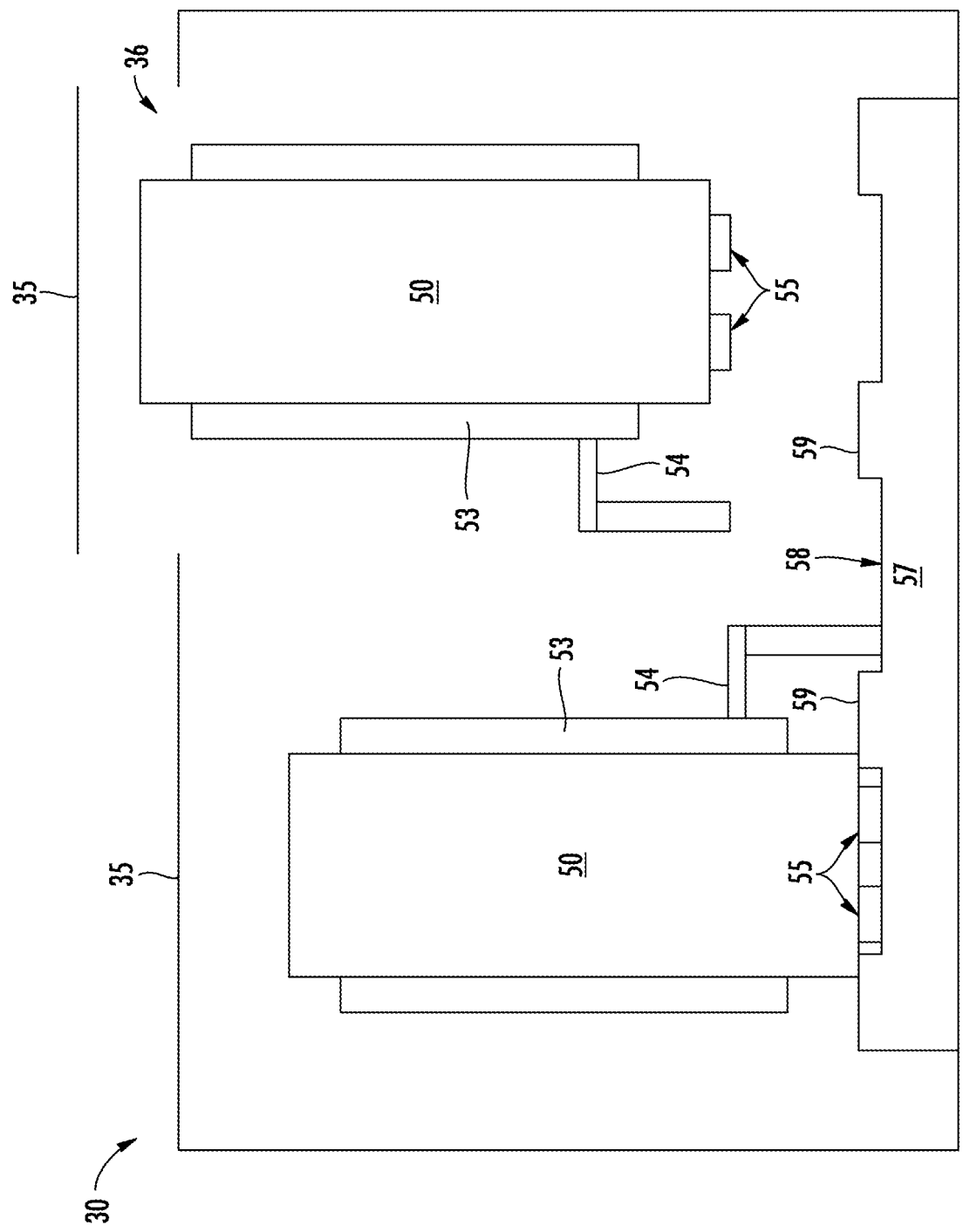
FIG. 8 is an elevation view illustrating an embodiment of a fuel cell system including a plurality of fuel cell stacks where the weight of the fuel cell stacks is used to seal against a process gas manifold below the fuel cell stacks.

Referring to FIG. 8, in one non-limiting example, the hot region 30 includes two fuel cell stacks 50 and a process gas manifold 57. Each fuel cell stack 50 includes a plurality of manifolds 53 and at least one process gas pipe 54 configured to fluidly connect the fuel cell stack 50 to the process gas manifold 57. An upper surface of the process gas manifold 57 includes a plurality of recesses 58 defined by projecting portions 59. The projecting portions 59 are configured to function as hard stops upon which a lower surface of the fuel cell stack 50 sits.

The removable sections of the upper thermal insulation 31 (shown in FIG. 1) may be a plurality of closure plates 35, each configured to be received in an overhead opening 36. Alternatively, the hot region 30 may include a plurality of fuel cell stack modules (i.e., modular enclosures), each having a plurality of closure plates 35, each configured to be received in an overhead opening 36. According to this alternative, an individual stack is enclosed in a protective case suitable for transportation. After transportation, the enclosed individual stack is dropped into the hot region 30. Prior to operation, the protective case is modified (i.e., opened) to the surrounding hot region 30.

The closure plate 35 is used to close an overhead opening 36 disposed above the fuel cell stack 50 after the fuel cell stack 50 is installed. A plurality of overhead openings 36 and closure plates 35 may be provided. For example, one overhead opening 36 and closure plate 35 may be provided for each fuel cell stack 50. In another example, one overhead opening 36 and closure plate 35 may be disposed above a group of fuel cell stacks 50.

The closure plates 35 are repeatedly and reversibly removable and configured to allow access to individual fuel cell stacks 50. During operation, overhead openings 36 may be closed or secured to maintain the temperature within the hot region 30 (or a modular enclosure within the hot region 30) e.g., constant, or above/below the ambient temperature. The individual fuel cell stacks 50 may be accessed, for example, by the crane 60 configured to lift a closure plate 35, access and remove an individual fuel cell stack 50, and transport the individual fuel cell stack 50 to a remote location for maintenance, repair or replacement. The crane 60 may also be used to insert and the individual fuel cell stack 50 (or modular enclosure including a plurality of fuel cell stacks) into the hot region 30.

The weight of the fuel cell stacks 50 can be used to seal against the process gas manifold 57. In some aspects (as illustrated in FIG. 8), the lower surface of the fuel cell stack 50 includes at least one sealing surface 55. In other aspects, the upper surface of the process gas manifold 57 may include at least one sealing surface 55. In even further aspects, each of the lower surface of the fuel cell stack 50 and the upper surface of the process gas manifold 57 may include at least one sealing surface 55. When the lower surface of the fuel cell stack 50 rests upon the projecting portions 59 of the process gas manifold 57, the vertical weight of the fuel cell stack 50 causes the sealing surface 55 to apply a predetermined facial pressure to the recess 58 of the process gas manifold 57. The seals 52 comprised of the sealing surfaces 55 may be gas seals such as compressive seals (e.g., spring bellows), radial seals, and/or tapered seals provided between the fuel cell stack 50 and the process gas manifold 57.

In-situ process gas seals 52 may take on various forms, as part of various fuel cell system and stack configurations, and utilize various mechanisms for effecting a seal and/or connection, such as those contemplated in U.S. Provisional Patent Application No. 62/329,509, which is incorporated herein by reference in its entirety for all purposes.

Referring back to FIG. 1, the cool region 40 is disposed above the hot region 30. The cool region 40 may include bus-bars that transfer DC current from the plurality of fuel cell stacks to power conditioning equipment located in the cool region 40 or external to the module 100. External plant support equipment 80 (also referred to as Balance of Plant (BoP) equipment), such as power conditioning choppers, inverters and controls, are located outside and adjacent to the enclosure 20.

Each of the plurality of fuel cell stacks 50 may be accessed from the cool region 40 via removable sections of the upper thermal insulation 31. The fuel cell stacks 50 may be accessed by crane 60, for example, by a mobile crane configured to move around the building (not illustrated), or where plant footprint is a premium, an integrated bridge crane co-located in the building (see FIG. 1). The crane 60 is configured for placement of and access to each of the plurality of fuel cell stacks 50. As seen in FIG. 1, the crane 60 can access an individual fuel cell stack 50 in the hot region 30 and transport the individual fuel cell stack 50 to the cool region 40 where it can be removed from the fuel cell module 100 for maintenance, repair or replacement.

Figure 5:
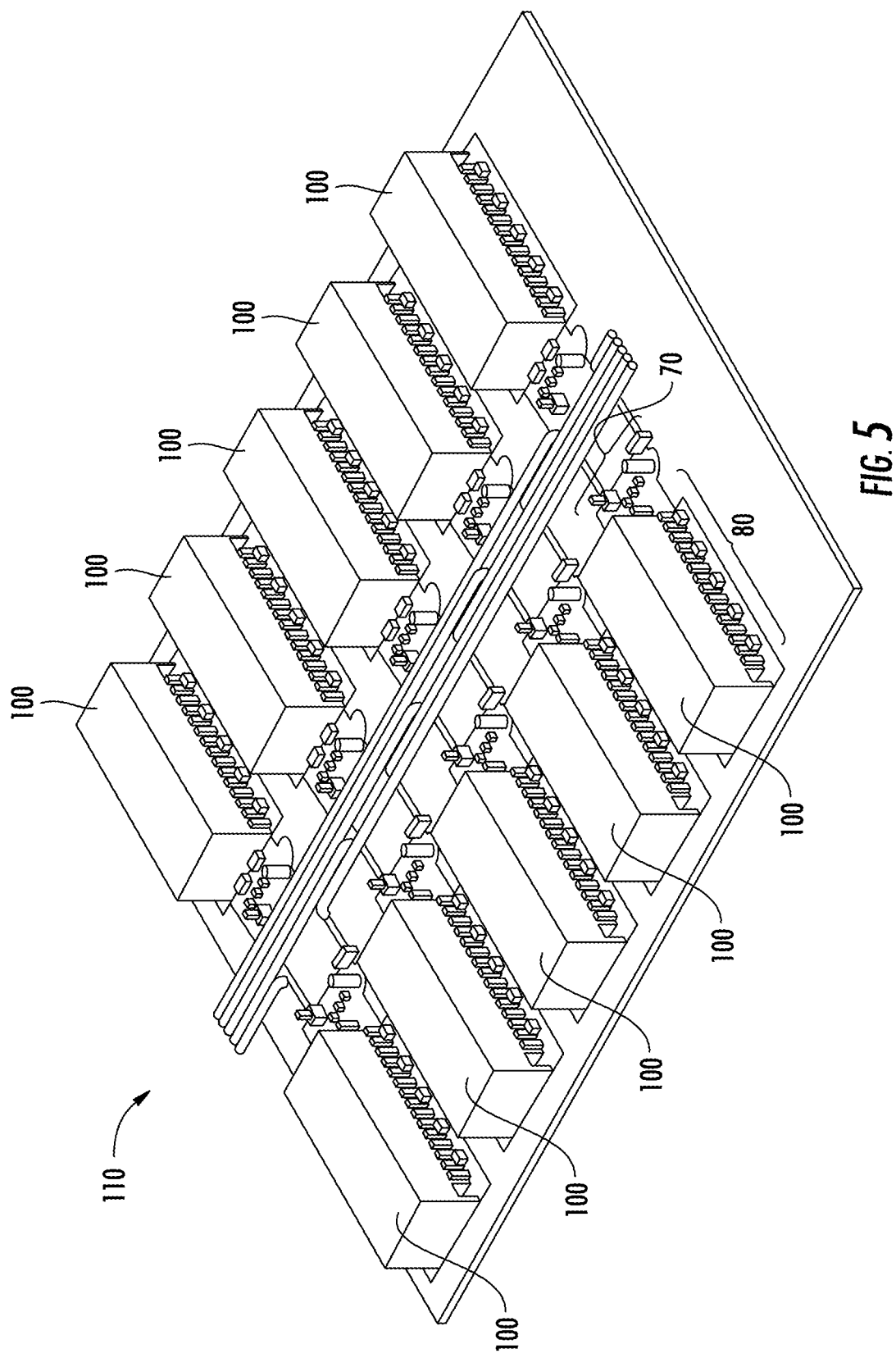
FIG. 5 is an example of a power plant including a plurality of the fuel cell module housings of FIG. 1, in particular, 10 fuel cell module housings, each having 200 fuel cell stacks. The power plant may be a carbon capture plant or any other type of power plant that utilizes fuel cell stacks.

Referring to FIG. 5, a power plant 110 includes a plurality of the fuel cell modules 100, each having a housing 20. In particular, FIG. 5 illustrates a power plant 110 with ten fuel cell modules 100, each having a housing and each having 200 fuel cell stacks 50 (see FIG. 2). Although the power plant 110 of FIG. 5 includes 2000 fuel cell stacks 50 that are divided into ten separate fuel cell modules 100, the present invention is not limited in this regard. Any number of fuel stack housings, each including any number of fuel cell stacks may be utilized. The power plant 110 may be a carbon capture plant or any other type of power plant that utilizes fuel cell stacks.

For example, FIG. 5 illustrates a system for separating $CO_2$ from the flue gas of a 550 MW power plant 110. As seen in FIG. 5, the ten modules 100 may be arranged in columns and rows on a property 667 feet wide and 620 feet long. The base 10 of each module 100 is a concrete pad that is 108 feet wide and 181 feet long. The enclosure 20 of the housing is 70 feet wide, 178 feet long and 50 feet high. The fuel cell stacks 50 are arranged in eight rows with twenty-five fuel cell stacks 50 per row, as shown in FIG. 2.

Fuel gas enters the module 100 and is distributed in four 26"×18" ducts in the lower hot region 34. The fuel gas flows upward from the ducts, in distributor tubes, to anodes of the fuel cell stacks 50. Cathode exhaust is collected in eight 30"×50" ducts, located below the fuel cell stacks 50 in the lower hot region 34, flows to the end of the module 100 where it is collected, and flows to other process equipment outside the fuel cell module 100. Anode exhaust gas, carrying carbon dioxide, exits the fuel cell stacks 50 and flows downward in collector tubes to two 24"×17" ducts and three 32"×28" ducts located in the lower hot region 34. The anode exhaust gas flows in the five ducts to the end of the module 100 where it is collected and routed outside of the module 100.

Figure 4:
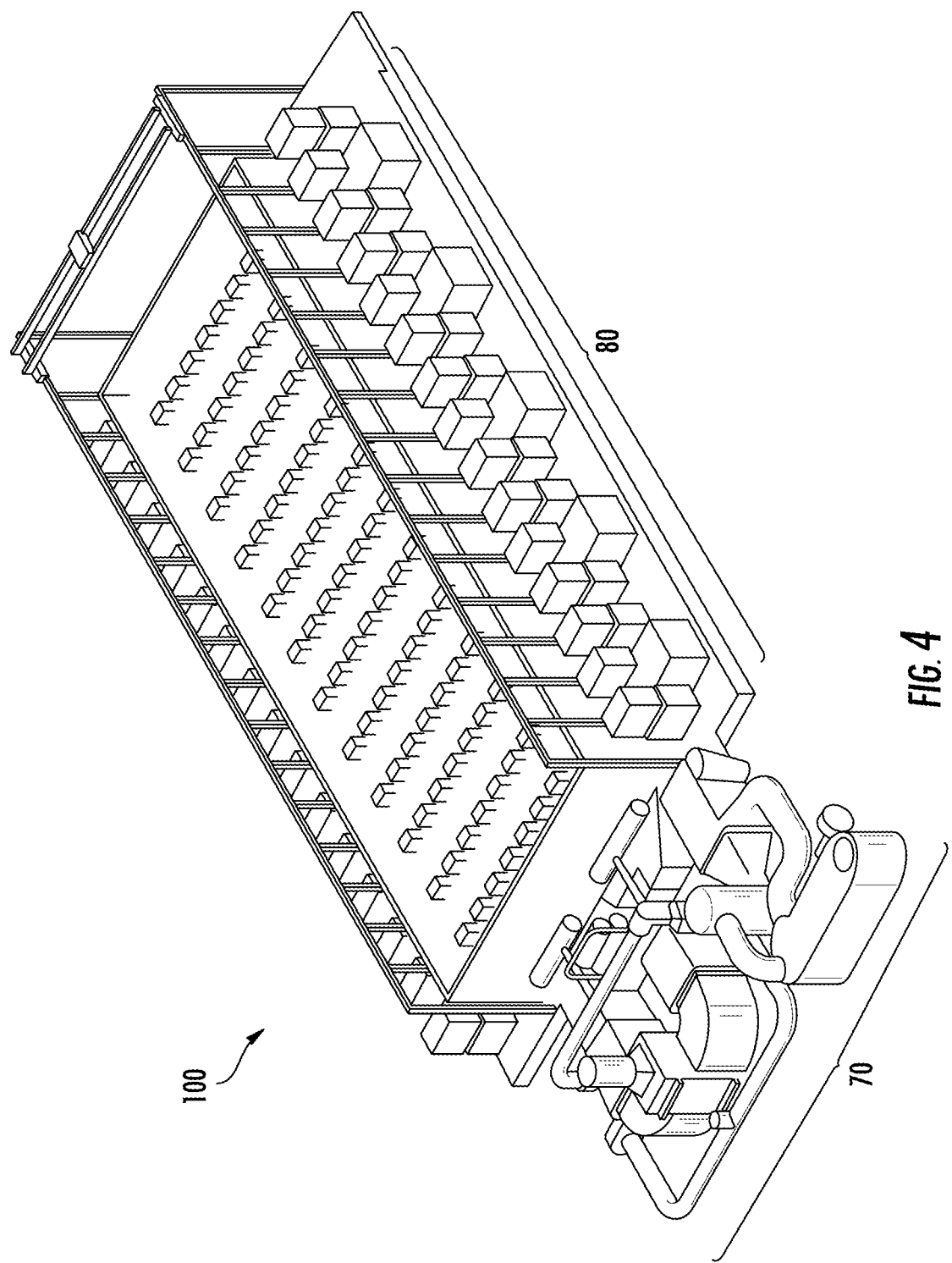
FIG. 4 is an example of the embodiment of the fuel cell module housing of FIG. 1, which includes 200 fuel cell stacks and associated hot Balance of Plant (BoP) equipment adjacent to the fuel cell module housing.

FIGS. 4 and 5 illustrate the general arrangement of the fuel cell modules 100 and associated BoP equipment 80, along with the piping for the distribution of coal plant flue gas to the ten modules 100 and collection of the $CO_2$-rich anode exhaust gas from the ten modules 100. The remainder of the balance-of-plant equipment such as the compressors and chillers may be centralized and located in an area to the side of the ten modules 100.

Second Embodiment

Figure 6:
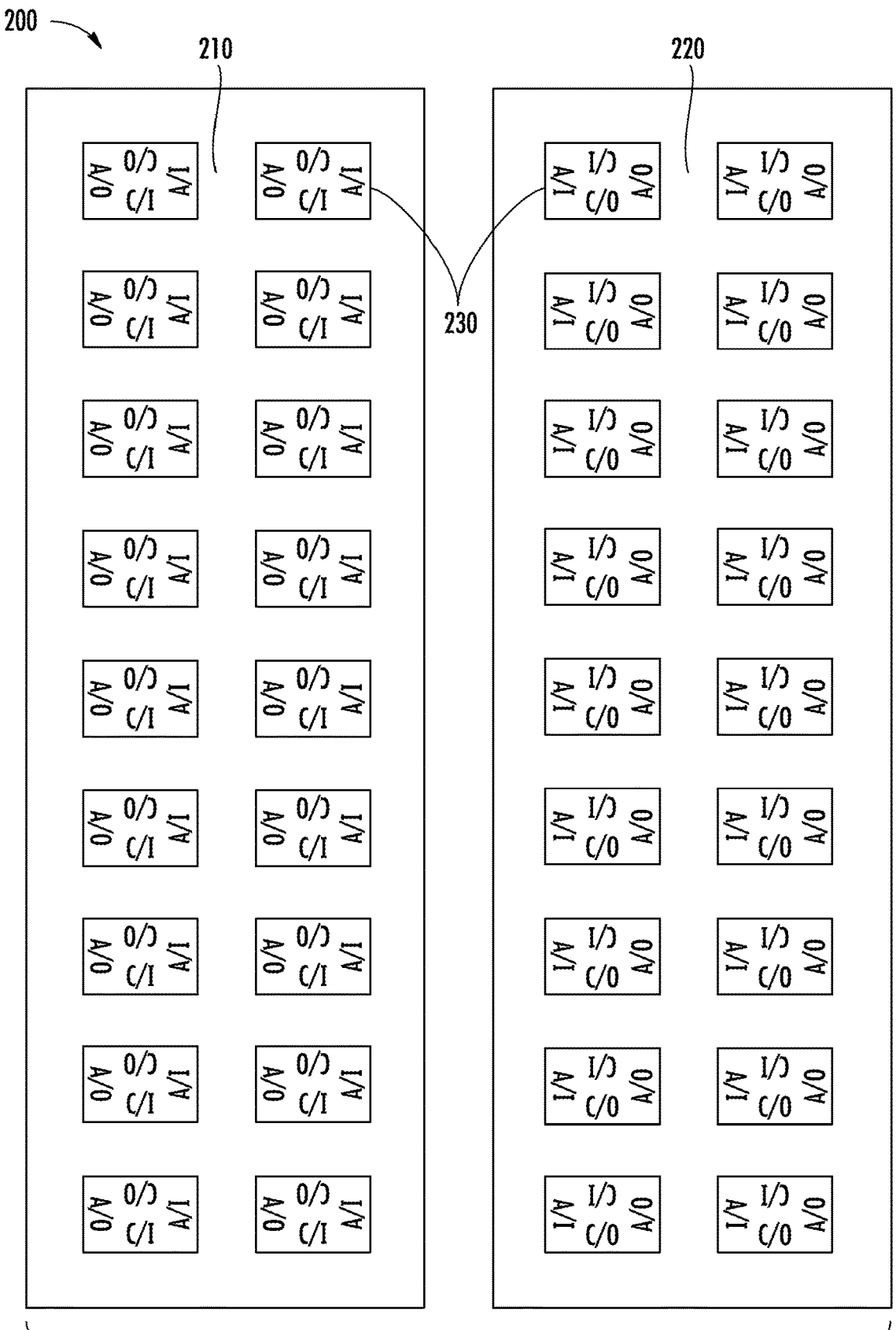
FIG. 6 is a plan view of a second embodiment of a fuel cell module module arrangement configured to house a plurality of fuel cell stacks. The fuel cell module module arrangement includes a primary module housing and a secondary module housing that are fluidly connected.
Figure 7:
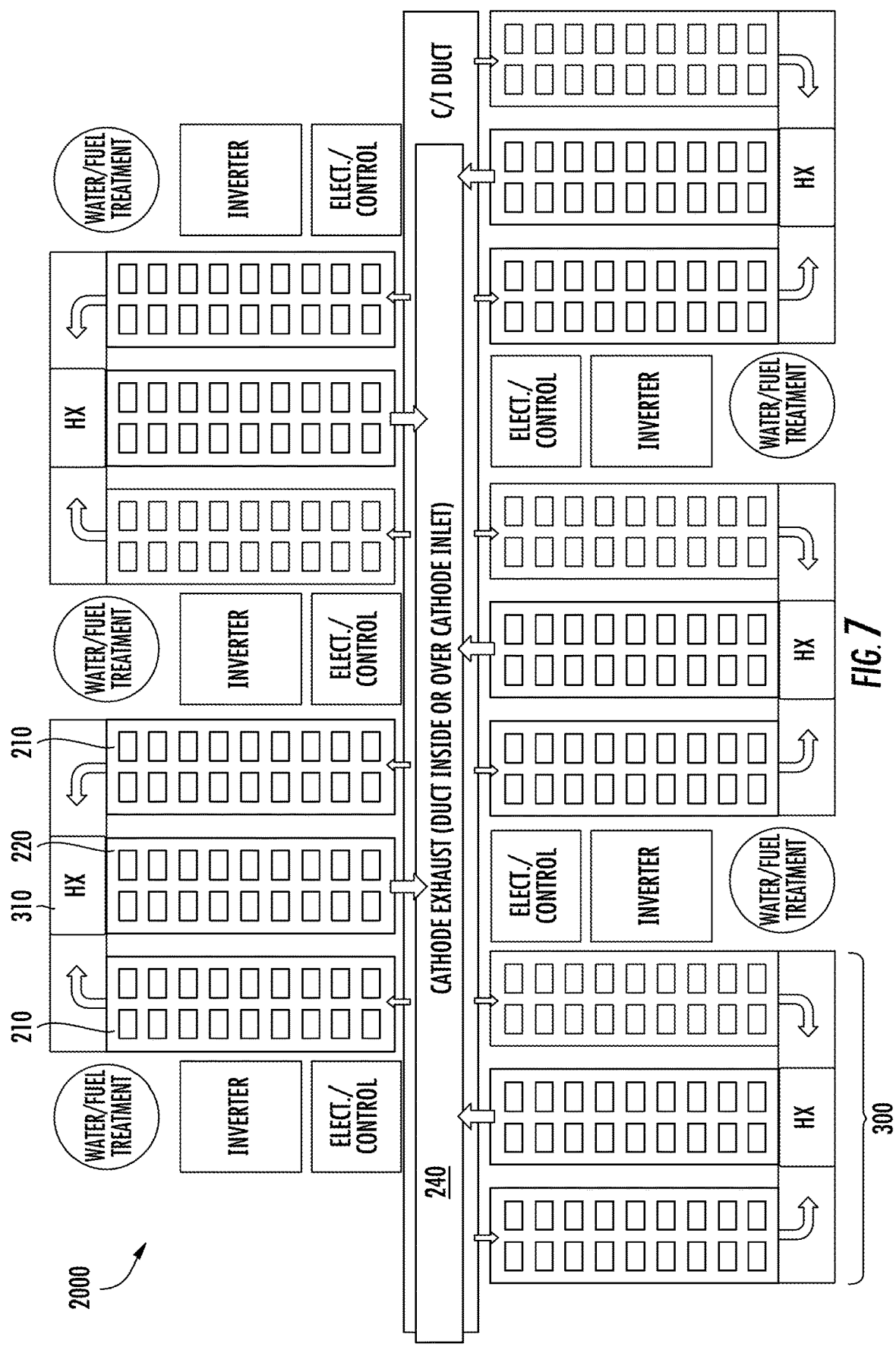
FIG. 7 shows an example of a power plant including a plurality of the fuel cell module module arrangements of FIG. 6. A plurality of primary module housings and secondary module housings are fluidly connected in series. The power plant may be a carbon capture plant or any other type of power plant that utilizes fuel cell stacks.

Referring to FIGS. 6 and 7, a module arrangement 200 includes at least one primary module 210 and at least one secondary module 220. Each of the primary module 210 and the secondary module 220 include a plurality of fuel cell stacks 230. The interior side walls, floor, and roof of the housing of the primary module 210 and the secondary module 220 are lined with thermal insulation. The insulated roof of each of the primary module 210 and the secondary module 220 is divided into sections disposed above each of the fuel cell stacks 230, or above a group of fuel cell stacks 230. The sections of the roof can be separately and individually removed to provide access to each fuel cell stack 230 via a crane (not illustrated). As described in the first embodiment, the fuel cell stacks 230 may be accessed by crane, for example, by a mobile crane configured to move around the building, or where plant footprint is a premium, an integrated bridge crane co-located in the primary module 210 or the secondary module 220. The crane is configured for placement of and access to each of the plurality of fuel cell stacks 230. The crane can access an individual fuel cell stack 230 and transport the individual fuel cell stack 230 to a location where it can be removed from the primary module 210 or the secondary module 220 for maintenance, repair or replacement.

Each of the primary module 210 and the secondary module 220 includes a base configured to support the plurality of fuel cell stacks 230. The base may be made, for example, of concrete, which can be further reinforced according to any known method. For smaller modules, for example, primary modules 210 and secondary modules 220 having tens of fuel cell stacks 230, the base may support or be embedded with pipes and ducts for process gas distribution and collection. For larger modules, housings of the primary module 210 and the secondary module 220 may include a lower level similar to the lower hot region 34 described in the first embodiment that includes the pipes and ducts for process gas distribution and collection. Alternatively, the pipes and ducts for process gas distribution collection may be located underground (i.e., beneath the base).

The primary module 210 and the secondary module 220 are in fluid communication. In particular, the primary module 210 is configured to output oxidant exhaust to the secondary module 220. The primary module 210 and the secondary module 220 may have a common gas duct 240. In certain embodiments, the common gas duct 240 is a single duct with a diverter or divider configured to separate and direct the oxidant supply and oxidant exhaust flows. In certain embodiments, the common gas duct 240 may be a stacked duct having a first duct for the oxidant supply and a second duct for the oxidant exhaust. The first duct may be disposed above the second duct, the first duct may be disposed beneath the second duct, or the first duct may be disposed beside the second duct. In other words, the first duct and second cut may be disposed in any configuration in which the first duct is adjacent to the second duct. In certain embodiments, the common gas duct 240 may have a duct-in-duct configuration. For example, the common gas duct 240 may be a cathode supply duct disposed within a cathode exhaust duct for supplying oxidant and receiving oxidant exhaust from the primary module 210 and the secondary module 220.

The fuel cell stacks 230 include face, radial, and/or tapered seals that are engaged in-situ when each of the fuel cell stacks 230 is installed. Sealing is relative, and minimized leak joints are more appropriate, especially for cathode gases where a leak less than approximately one percent could be tolerated. This enables the use of somewhat porous and compliant materials, for effective in-situ seals. The seals may be effected via various methods including static force from the weight of the fuel cell stacks 230 compressing a gasket or ring seal, differential thermal expansion providing a radial seal, and/or mechanical joining of tapered ports. The sealing configuration may be similar to that described in the example of FIG. 8.

The in-situ process gas seals may take on various forms, as part of various fuel cell system and stack configurations, and utilize various mechanisms for effecting a seal and/or connection, such as those contemplated in U.S. Provisional Patent Application No. 62/329,509, which is incorporated herein by reference in its entirety for all purposes.

Referring to FIG. 7, a power plant 2000 includes a plurality of the module arrangements 300. Each module arrangement 300 includes a first primary module 210, a second primary module 210 and a secondary module 220 disposed between the first and second primary modules 210. The modules within the module arrangements 300 are connected in series with respect to oxidant gas flow. In particular, oxidant is supplied to each of the first and second primary modules 210 by the common gas duct 240, oxidant exhaust from the first and second primary module 210 is fed to a common heat exchanger 310 to be cooled/condensed, and then fed to the secondary module 220. Oxidant exhaust from the secondary module 220 is output to the common gas duct 240.

Although the power plant 2000 of FIG. 7 includes 5 module arrangements 300, and each of the primary modules 210 and secondary module 220 includes 18 fuel cell stacks 230, the present invention is not limited in this regard. Any number of module arrangements 300, each including any number of fuel cell stacks, may be utilized. The power plant 2000 may be a carbon capture plant or any other type of power plant that utilizes fuel cell stacks.

For example, FIG. 7 illustrates a system for separating $CO_2$ from the flue gas of a 270 MW power plant 2000. Although FIG. 5 illustrates a 550 MW power plant and FIG. 7 illustrates a 270 MW power plant, the present invention is not limited in this regard. The first and second embodiments of fuel cell module housings may be applied to any power systems, and are therefore, not limited by size or power output. Moreover, a power plant utilizing the fuel cell module housings of the first embodiment (FIGS. 1-5) may have a power output equal to, less than, or greater than a power plant utilizing the fuel cell module arrangements of the second embodiment (FIGS. 6 and 7).

Although the anode gas flows are not illustrated in FIGS. 6 and 7, anode gas flows in parallel, as opposed to flowing in series like the cathode gas.

As seen in FIG. 7, additional components such as water/fuel treatment systems, inverters, or additional electrical equipment/controls can be stored in between adjacent module arrangements 300.

In each of the embodiments described above, the plurality of fuel cell stacks may be erected and installed in the field, thereby eliminating the costs and problems associated with shipping such large fuel cell arrangements. In addition, in each of the embodiments described above, individual fuel cell stacks may be accessed and replaced in the field. This eliminates the need to remove and/or transport an entire module (i.e., the entire enclosure containing the plurality of fuel cell stacks) in order to perform maintenance, repair or replacement of a single fuel cell stack. Because the fuel cell stacks can be erected, installed and replaced in the field, shipping, piping, insulation, replacement and field servicing costs can be reduced, and the footprint of the power plant can also be reduced.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

References herein to the positions of elements (e.g., "top," "bottom," "above," "below," etc.) are merely used to describe the orientation of various elements in the Figures. It should be noted that the orientation of various elements may differ according to other exemplary embodiments, and that such variations are intended to be encompassed by the present disclosure.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention. For example, the heat recovery heat exchangers may be further optimized.

What is claimed is:

1. A power plant comprising:
a plurality of fuel cell modules, wherein each fuel cell module comprises:
a plurality of fuel cell stacks;
a manifold configured to provide process gases to and receive process gases from the plurality of fuel cell stacks; and
a module housing enclosing the plurality of fuel cell stacks and the manifold;
wherein each fuel cell stack is individually installable onto the manifold by lowering the fuel cell stack onto the manifold, and is individually removable from the manifold by raising the fuel cell stack from the manifold;
wherein each module housing defines a hot region, and a cool region located above the hot region;
wherein each fuel cell module comprises a thermally insulating wall separating the hot region from the cool region;
wherein each thermally insulating wall comprises a plurality of openings and a plurality of closure plates, each closure plate removably closing a respective opening among the plurality of openings, wherein each opening and each respective closure plate corresponds to a respective fuel cell stack among the plurality of fuel cell stacks;
wherein each fuel cell stack of each fuel cell module is individually installable onto the manifold by removing the respective closure plate from the respective opening of the thermally insulating wall, and lowering the fuel cell stack from the cool region through the respective opening to the hot region and onto the manifold; and
wherein each fuel cell stack of each fuel cell module is individually removable from the manifold by removing the respective closure plate from the respective opening of the thermally insulating wall, and raising the fuel cell stack off of the manifold and from the hot region through the respective opening to the cool region.

2. The power plant of claim 1, wherein the power plant is configured such that, when one of the plurality of fuel cell modules is taken offline, the remaining fuel cell modules are configured to continue to operate.

3. The power plant of claim 1, wherein:
the plurality of fuel cell modules are divided into a plurality of module arrangements, each of which includes a primary module and a secondary module; and
in each module arrangement, the primary module is configured to output oxidant gas to the secondary module.

4. The power plant of claim 3, wherein each module arrangement includes first and second primary modules, each of which is configured to output oxidant gas to the secondary module.

5. The power plant of claim 4, wherein the manifold comprises a common oxidant gas duct that includes an oxidant supply duct configured to supply the oxidant gas to the first and second primary modules and an oxidant exhaust duct configured to receive oxidant exhaust from the secondary module.

6. The power plant of claim 3, wherein the plurality of fuel cell modules are configured to receive anode gas in parallel.

7. The power plant of claim 1, wherein each fuel cell stack is installable onto and removable from the manifold without manual mechanical attachment between the fuel cell stack and the manifold.

8. The power plant of claim 1, wherein each fuel cell stack comprises a plurality of molten carbonate fuel cells.

9. The power plant of claim 1, wherein each fuel cell stack is installable onto and removable from the manifold via a crane.

10. The power plant of claim 1, wherein each fuel cell module comprises a concrete base configured to support the respective module housing.

11. The power plant of claim 1, wherein each module housing comprises sheet metal siding and sheet metal roofing.

12. The power plant of claim 1, wherein the plurality of fuel cell stacks of each fuel cell module are disposed in the hot region and supported by heat resistant supports.

13. The power plant of claim 1, wherein, in each fuel cell module:
the hot region includes at least one upper hot region and at least one lower hot region;
the plurality of fuel cell stacks are located in the at least one upper hot region; and
the manifold is located in the at least one lower hot region.

14. The power plant of claim 13, wherein each fuel cell module comprises a plurality of in-situ process gas seals configured to seal between the plurality of fuel cell stacks and the manifold, wherein the in-situ process gas seals operate via static force from the weight of the plurality of fuel cell stacks.

15. The power plant of claim 1, wherein each fuel cell module comprises at least one bus-bar that is located in the cool region and is configured to transfer current from the plurality of fuel cell stacks to power conditioning equipment.

* * * * *